United States Patent [19]

Little

[11] Patent Number: 4,635,848

[45] Date of Patent: Jan. 13, 1987

[54] IRRIGATION ADDITIVE DELIVERY SYSTEM

[76] Inventor: Charles F. Little, 1188 Lockhaven Way, San Jose, Calif. 95129

[21] Appl. No.: 795,651

[22] Filed: Nov. 6, 1985

[51] Int. Cl.⁴ ............................................... B05B 7/30
[52] U.S. Cl. ..................................... 239/10; 137/102; 137/564.5; 137/218; 239/310; 239/323
[58] Field of Search ....................... 239/1, 10, 66, 310, 239/318, 323, 327; 137/102, 109, 218, 564.5, 888, 892, 893

[56] References Cited

U.S. PATENT DOCUMENTS

| | | |
|---|---|---|
| 3,198,438 | 8/1965 | Hultgren . |
| 3,521,676 | 7/1970 | Handeland ........................ 137/564.5 |
| 3,556,141 | 1/1971 | Hind .................................. 137/564.5 |
| 3,720,230 | 3/1973 | Miller et al. ..................... 137/564.5 |
| 3,974,847 | 8/1976 | Hodges ....................... 137/564.5 X |
| 4,248,266 | 2/1981 | Queen . |
| 4,281,935 | 8/1981 | Cramer et al. . |
| 4,364,516 | 12/1982 | Rhoades et al. . |
| 4,418,869 | 12/1983 | Healy . |

Primary Examiner—Andres Kashnikow
Attorney, Agent, or Firm—Limbach, Limbach & Sutton

[57] ABSTRACT

Apparatus and method of its use for delivering liquid additives to irrigation units which comprises an additive liquid source and means for injecting said additives. Injection means utilize the venturi effect to permit controlled delivery of additive to fluid bound for the sprinkler circuit. Check valves permit connection of one additive liquid source to a series of water supplies. A pressure relief valve having sliding members is also described.

20 Claims, 18 Drawing Figures

RICHDEL TYPE ANTISYPHONE VALVE AND INJECTOR

11a OFF, TURN ON
11b
11c POSITION WHILE OPERATIONAL

11d TURN OFF
11e RELEASES PRESSURE IN BOTTLE
11f OFF

CHAMPION TYPE ANTISYPHONE VALVE AND INJECTOR

IRRIGATION ADDITIVE DELIVERY SYSTEM

DESCRIPTION

1. Technical Field

This invention generally relates to apparatus for use in conjunction with standard sprinkler-type irrigation systems. More particularly, this invention relates to an addition to the anti-syphon valve of the irrigation system, and method for its use, which is capable of delivering liquid additives to more than one sprinkler circuit.

2. Background of the Invention

Several standard types of lawn irrigation systems are presently in use. The more commonplace irrigation systems use the plastic molded Richdel-type anti-syphon valve shown in FIG. 1; a cast metal Champion-type anti-syphon valve is also common. Each circuit of the irrigation system is characterized by a water flow supply, an anti-syphon valve and a series of sprinkler heads. Each circuit must contain an anti-syphon valve to prevent contamination of the water source by backflow.

Several inventions have been directed toward apparatus and methods for injecting fluid additives in metered amounts. In U.S. Pat. No. 3,974,847 (Aug. 17, 1976), an apparatus for dispensing liquid additives into a Champion-type sprinkler system is disclosed. This invention discloses an apparatus which taps into the fluid flow by inserting a probe into its path. This probe has upstream and downstream pressure ports which are connected to displacement liquid and additive liquid containers, respectively. The additive liquid, contained in a flexible-walled container, is forced out of its container by the displacement liquid which exists at a slightly higher pressure. The upstream pressure on the displacement liquid causes additive liquid to be injected on the downstream side, where the pressure is slightly lower.

U.S. Pat. No. 3,974,847 also discloses a sintered metal restrictor in the line connecting the upstream port with the displacement liquid container. This restrictor acts as a means for reducing the pressure differential between the upstream and downstream ports and thereby determines the amount of additive introduced into water flow means. This apparatus omits check valves in the various flow means which can prevent the potential dilution or contamination of the additive by a reversal of flow. Further, this apparatus does not permit one additive container to be connected serially to several water flow supplies, i.e., separate circuits. This invention also requires destructive interference with the plastic molded Richdel-type anti-syphon apparatus or the cast metal Champion-type described in the patent.

U.S. Pat. No. 3,556,141 (Jan. 19, 1971) discloses another device for feeding liquid fertilizer to a flowing stream of water. The fertilizer container is flexible and is placed in a housing having a pressure connection upstream of a metering venturi. The metering venturi causes a pressure drop in the fluid stream; the fertilizer is then injected downstream stream as a result of a negative pressure differential, resulting from the reduced flow area (venturi effect).

U.S. Pat. No. 3,521,671 (July 28, 1970) discloses another type of additive fluid metering apparatus. A flexible fluid container is received within a larger rigid-walled container. Fluid flow means are connected to the rigid container, creating a pressure within the flexible container equivalent to the operating pressure of fluid flow means. The flexible container is connected to a downstream location, and check valves are located on either side of the additive inlet. The amount of additive injected is determined by the size of the fluid flow pump and the needle valve setting on rigid-walled container flow means. The apparatus of this invention does not rely upon a venturi to affect the metered introduction of additive, but relies on the pump pressure instead.

U.S. Pat. No. 3,720,230 (Mar. 13, 1973) discloses another apparatus for adding measured quantities of concentrates or solution to a fresh water supply. This apparatus also utilizes a "bladder" configuration, wherein a flexible walled container is received within a rigid-walled container. This apparatus connects an upstream location with the rigid walled container, while the liquid in the flexible walled container is injected into the conduit downstream. This apparatus relies upon the venturi effect to inject and to admix the additive into the fresh water supply. This invention is particularly suited for treatment by municipalities of the fresh water supply to ordinary residences.

Even though the prior art discloses several systems wherein upstream pressure is utilized to inject liquid into the downstream flow via the venturi principle, none of these systems are directed towards the particular design problems resulting from the connection of one additive container to multiple sprinkler circuits which operate at different pressures. When one liquid additive container is connected to several different sprinkler circuits operating at different pressures, venting of the additive container and rigid walled container are necessary to permit equilibrium to be established in each circuit. Further, the connections to the non-operating circuits must close when another circuit is activated. The subject invention focuses on these problems. The cooperation of the components of the present invention permit connection of one additive supply to multiple circuits operating at different pressures and times.

It is therefore an object of this invention to provide an apparatus which is capable of connection to a series of sprinkler circuits.

It is yet another object of this invention to provide a system which will permit the introduction of a variety of additives at predetermined rates, such additives being fertilizers, pesticides, herbicides and fungicides.

It is yet another object of this invention to provide an apparatus which is easily interchangeable with standard equipment, particularly the Richdel-type and Champion-type anti-syphon valves.

It is a further object of this invention to provide a non-destructive means of tapping into already existing sprinkler systems.

It is another object of this invention to provide an apparatus which can provide a controlled additive flow rate, thereby preventing over-application.

It is yet another object of this invention to provide an apparatus whose parts can be easily removed for replacement and maintenance.

SUMMARY OF THE INVENTION

This invention comprises an additive bag and a surrounding rigid container which can be connected to a series of sprinkler circuits by modifying a common anti-syphon valve apparatus to include two liquid ports which communicate with the additive bag and rigid container. Pressure activated check valves are provided to prevent back-mixing, as well as to shut off each circuit from the additive system when another circuit is in use. A specially designed pressure relief valve is placed in the line between the rigid walled container and the injection housing apparatus. This valve vents above-atmospheric pressure when any one particular water supply is shut off. This valve's dynamic response to changes in pressure permits connection of the same additive bag and rigid walled container to a series of sprinkler circuits operating at different pressures.

During normal operation, the back pressure on the additive bag created by the rigid walled container causes additive to be injected into the water flow via the venturi principle since the injection port is located in an area of increased fluid velocity through the anti-syphon valve housing.

DESCRIPTION OF THE PREFERRED EMBODIMENTS

Figure 1:
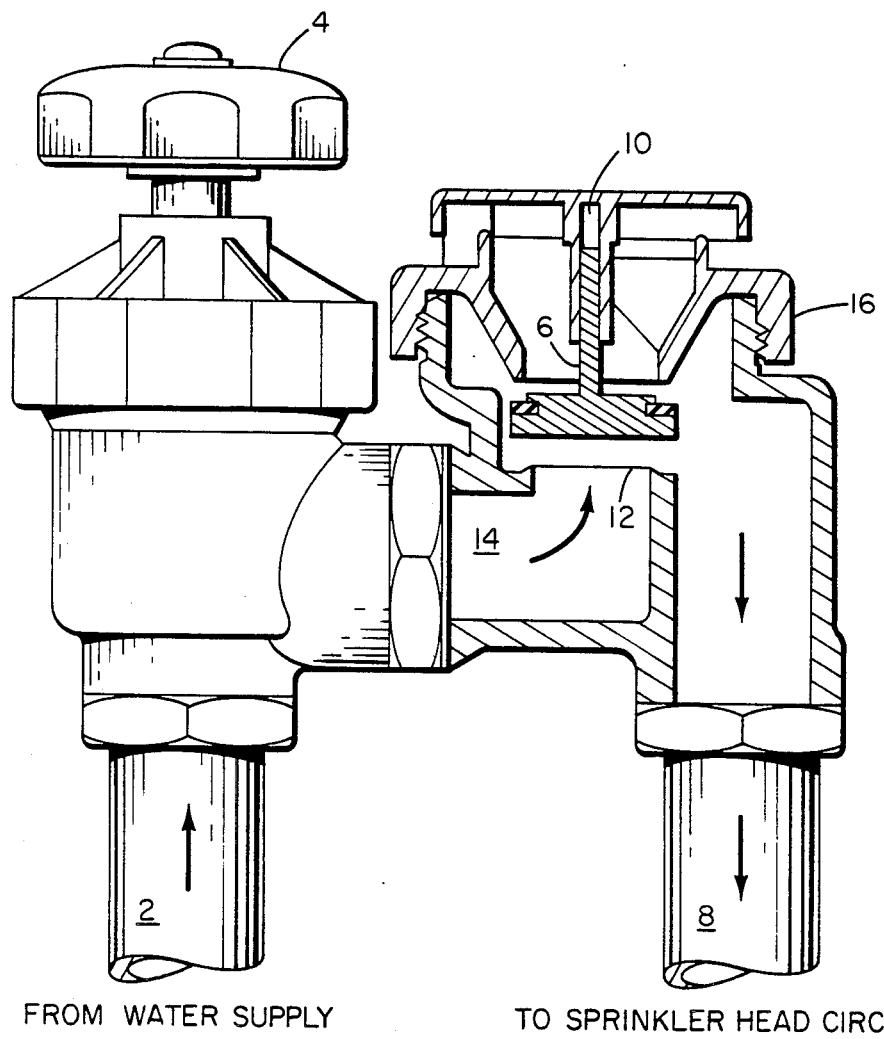
FIG. 1 is an elevational view of the Richdel-type plastic molded anti-syphon valve of the prior art.

FIG. 1 shows the Richdel-type anti-syphon valve of the prior art. The anti-syphon valve is placed between a water supply 2 and a sprinkler head circuit (not shown in this figure) to prevent fluids on the downstream side of the anti-syphon valve from mixing with the main water supply. Typically, the anti-syphon valve consists of two separate valves, a shut-off valve 4 and slide valve means 6. Referring to FIG. 1, water enters the apparatus from the water supply 2 and flows through the shut-off valve 4. When the shut-off valve 4 is open, the water flows through the shut-off valve 4, into chamber 14 and then towards slide valve means 6. The water flow forces slide valve means 6 to move up and away from a valve seat 12. The sliding action of slide valve means 6 is maintained by a channel 10 located in the middle of valve housing cap 16. When slide valve means 6 slides upward in channel 10, water flows out of the chamber 14 through the valve seat 12 and into water flow means 8, towards the sprinkler head circuit (not shown in FIG. 1.) When the water flow is reduced by closure of valve 4, slide valve means 6 travels towards valve seat 12. When the shut-off valve 4 is totally closed, slide valve means 6 seals at the valve seat 12. This prevents fluids on the upstream side of slide valve means 6 from mixing with the water remaining in the chamber 14.

Installation, maintenance and operation of slide valve means 6 is facilitated by the design of the valve housing cap 16. The housing cap 16 is threaded on the inside to meet with threads located on the main anti-syphon valve housing which houses the valve seat 12, chamber 14 and waterflow means 8. Slide valve means 6 is designed to operate at any water pressure which may develop from the water supply 2. As shown in FIG. 1, slide valve means 6 is received within channel 10 without spring biasing or other counter force means. Nonetheless, this valve means' ability to operate over a wide range of water pressures is an essential feature of this type of anti-syphon valve.

Figure 2:
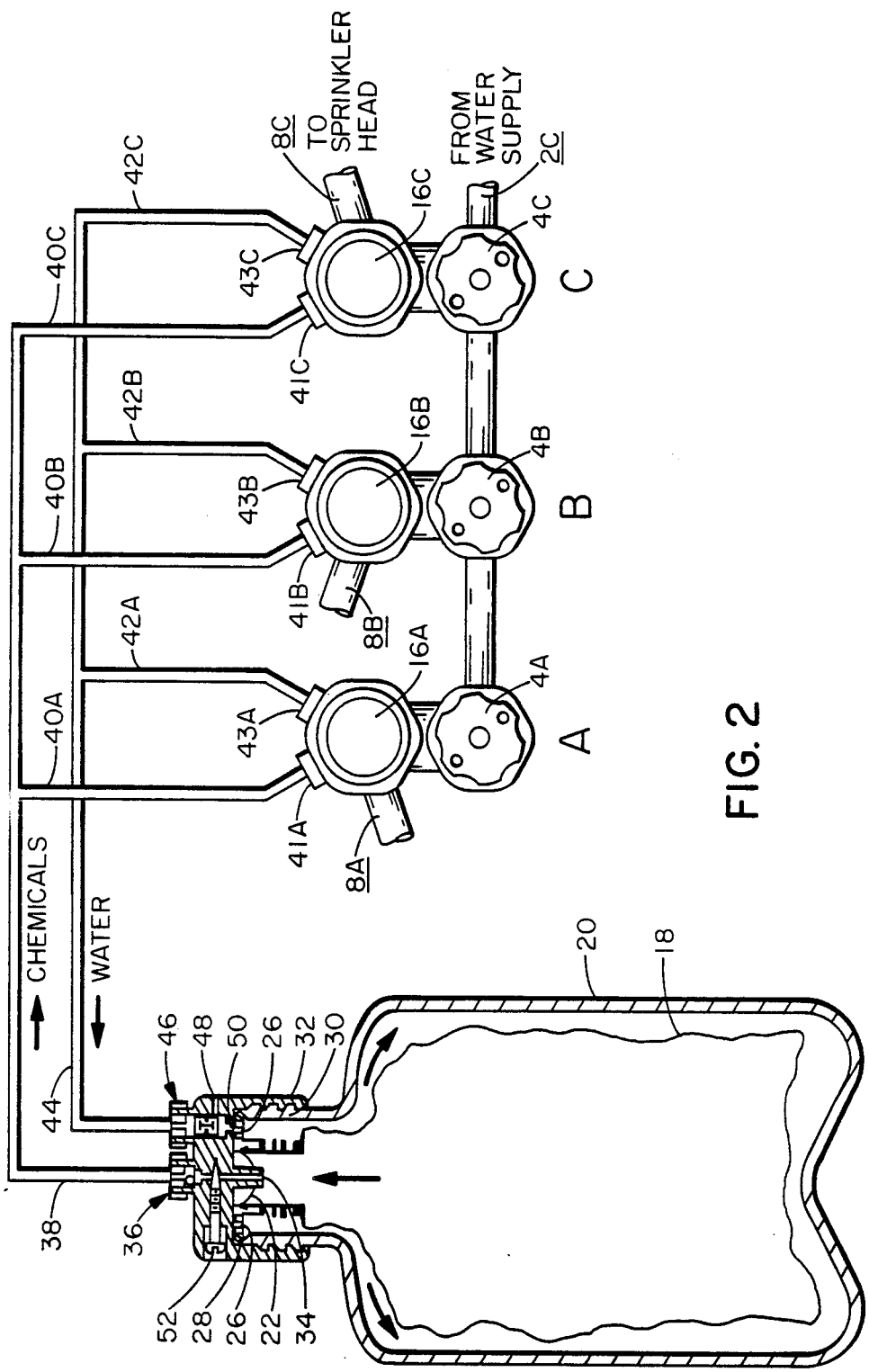
FIG. 2 is an elevational view of a series of sprinkler circuits attached to the rigid walled container and additive bag.

FIG. 2 shows the relationship between several anti-syphon valves 16a, 16b and 16c, the rigid container 20 and the additive bag 18 of the present invention. The influence on flow by the pressure activated valves is indicated (see legend), as well as the direction of flow of the additives and water while the system is operational.

Figure 5:
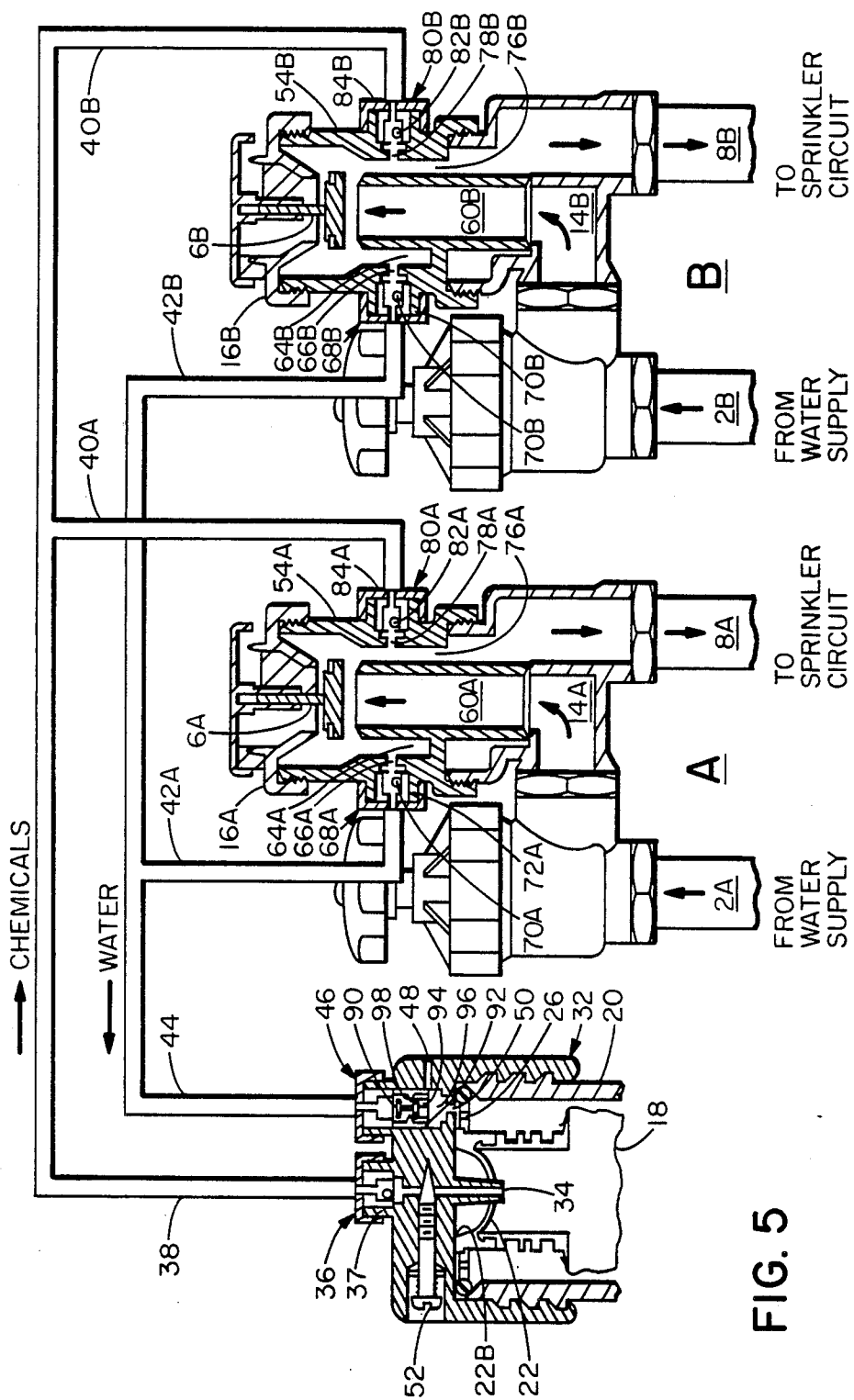
FIG. 5 is an enlarged elevational view of the rigid container cap, additive bag, two sprinkler circuits and their anti-syphon valve and injection housing units.
Figure 9:
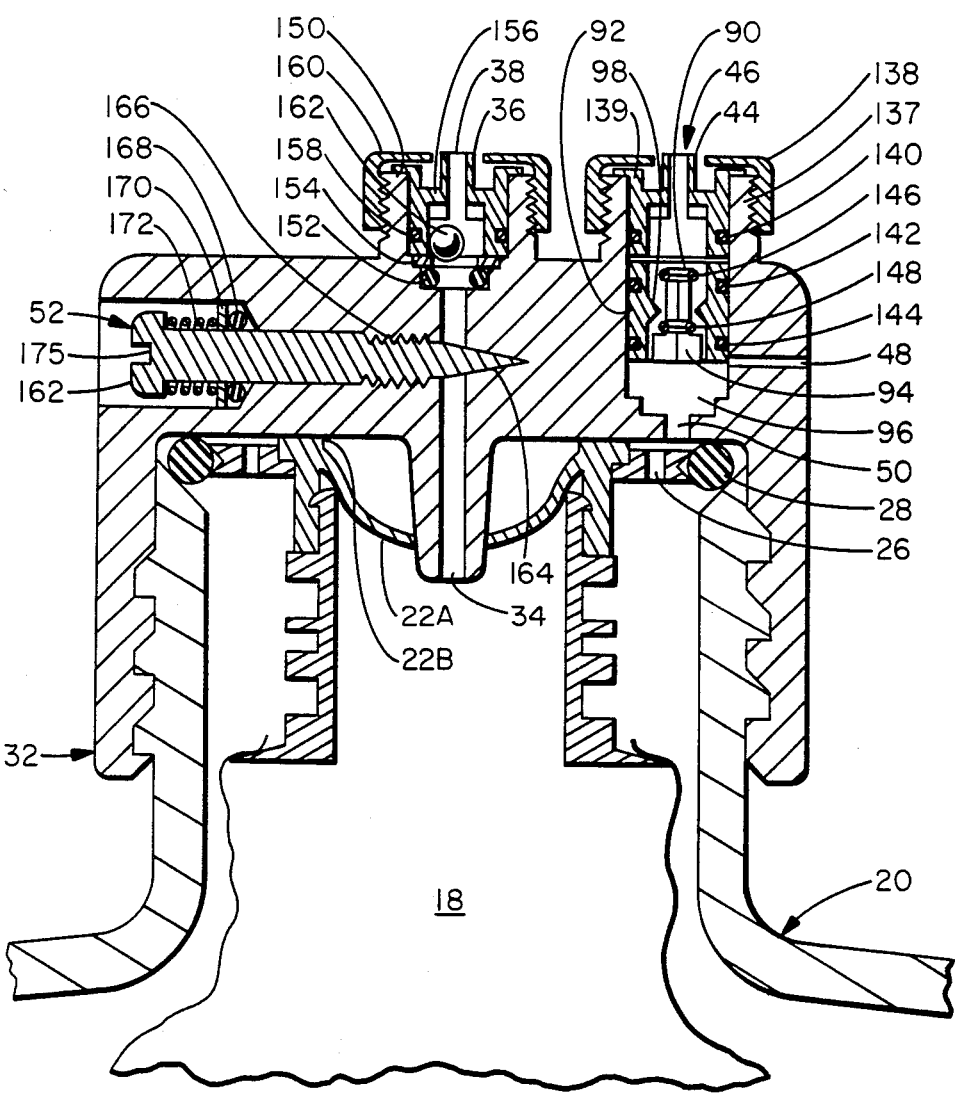
FIG. 9 is an enlarged vertical sectional view of the rigid container cap, additive bag flow means, check valve, needle valve and pressure relief valve.

A cap 32 is placed over a nozzle 30 at the top of a rigid container 20 to permit an additive bag 18 and rigid container 20 to operate at above atmospheric pressures (see FIGS. 5 and 9). Rigid container O-ring 28 is placed at the top of rigid container nozzle 30. Thus, when the cap 32 is fastened to the top of the rigid container 20, via nozzle's external threads, a seal is formed and maintained by rigid container O-ring 28. This seal permits the additive bag 18 and rigid container 20 to be maintained at different operating pressures.

The need for maintaining the additive bag 18 and rigid container 20 at different operating pressures is illustrated in FIG. 2. In this particular preferred embodiment, the rigid container 20 is a high pressure plastic bottle. The additive bag 18 comprises a collapsible plastic bag filled with a liquid, often an aqueous solution. The rigid container cap 32 is secured to the container 20 by nozzle's external threads. An additive outlet 34 communicates through the additive bag seal 22, thereby providing an outlet for the additive liquid contained within the bag 18, while permitting the additive bag's internal pressure to be maintained by a seal 22. At the top of the container cap 32 is an additive outlet check valve 36. In this preferred embodiment, a ball-type check valve is used to prevent flow toward the additive bag 18. The additive bag 18 is connected to sprinkler circuits A, B, and C by an additive delivery line 38. The additive delivery line 38 is then separately joined at one end to each, respective sprinkler circuit via additive injection circuits 40a, 40b, and 40c. The additive injection circuits 40 are joined at their other ends to the valve housing caps 16a, 16b and 16c, at additive liquid ports 41a, 41b, and 41c.

Valve housing caps 16 also contain back pressure ports 43a, 43b, and 43c which join back pressure circuits 42a, 42b, and 42c at one of their ends. Rigid container line 44 joins the other end of back pressure circuits 42. A pressure relief valve 46 permits rigid container line 44 to communicate through the container cap 32. Located above the nozzle external threads, but just below the pressure relief valve 46, is a vent 48 which allows the rigid container 20 to selectively exhaust above atmospheric pressures. The rigid container 20 is connected to the pressure relief valve 46 through the overflow outlet 26 at the neck of the container 20, and through the cap 32 by way of a rigid container outlet 50, which comprises in part one end of the pressure relief valve 46.

On the other side of the cap 32, the magnitude of additive fluid flow from the additive bag through outlet 34 is regulated by a needle valve 52.

Sprinkler circuits A, B and C shown in FIG. 2 are typically connected to one water supply 2 with a static water pressure. Circuits A–C operate one at a time, often at different dynamic water pressures. These differences in water pressure result from the different fluid flow resistances in each sprinkler circuit, caused by differing fluid paths, elevations, piping diameters and distances from the main water supply.

Since each water supply is connected to the additive bag 18 and rigid walled container 20 through valve housing caps 16, modifications in the caps 16 are required to convey and to isolate these varying dynamic operating pressures, and to permit delivery of additive to each circuit via venturi-type injection. One of the differences between the subject invention and the prior art concerns the ability of the instant system to deliver additive to each one of the sprinkler circuits from a single common additive source.

Figure 3:
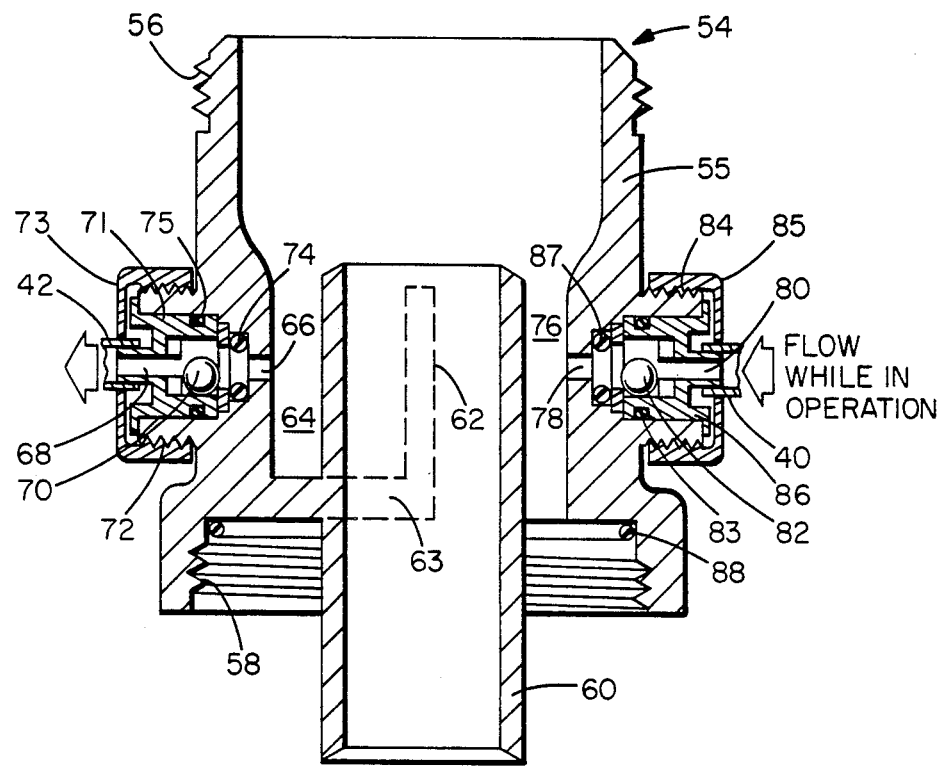
FIG. 3 is an enlarged vertical sectional view of the injection housing of the anti-syphon valve.

Some of the modifications which permit delivery of additive from a common source to a series of sprinkler circuits are described with reference to FIG. 3. An injection housing insert 54 is designed to be compatible with the Richdel-type anti-syphon shown in FIG. 1. As described with reference to FIG. 1 above, slide valve means 6, contained within valve housing cap 16, is removed by simply unscrewing the threaded cap 16. The injection housing insert 54 is then placed between the valve housing cap 16 and the main body of the anti-syphon valve (not shown in FIG. 3), and secured thereto by upper external threads 56 and lower internal threads 58.

Since this preferred embodiment of the insert 54 increases the vertical distance between the valve seat 12 and slide valve means 6 (FIG. 1), valve seat extension 60 provides a valve seat within the insert 54 which can be sealed by slide valve means 6. The insert 54 also contains a vertical diameter section 62 which divides the insert 54 into two distinct regions. On one side of insert 54, a restricted area or a reservoir 64 is formed by the vertical section 62 and a horizontal section 63; the reservoir 64 prevents air from entering the system and is an area of reduced fluid flow velocity. It is from this reservoir 64 that back pressure liquid port 66 communicates with the back pressure circuit 42, passing through the cylindrical insert wall 55 via a back pressure circuit check valve outlet 68. In this preferred embodiment, the back pressure circuit check valve outlet 68 is a ball-type check valve intended to prevent high velocity flow through the valve toward the reservoir 64.

In one particularly preferred embodiment of the ball-type check valve 68, the ball 70 is a 3/16 inch stainless steel ball. The check valve housing 71 is held in the back pressure port 66 by back pressure port nozzle threading 72 and back pressure port cap 73. O-ring seal 74 is held into position by check valve housing 71 forming a seal between the injection housing insert 54 and the stainless steel ball 70. Another O-ring 75 seals the housing 71 within the channel created inside the nozzle 72.

In a second annular region between the valve seat extension 60 and the insert wall 55, not shielded by the vertical diameter section 62 and horizontal section 63, is an injection region 76. In this region fluid which has flowed out of the extension 60 passes by the outside of the extension 60, reversing its flow direction by 180°, and then flowing down towards a lower end of the insert 54. A venturi effect is created by an increased rate of flow in region 76. The venturi effect permits additives to be injected into the fluid which is headed toward the sprinkler circuit because the pressure of the additive, which is equivalent to the upstream fluid pressure, is greater than the reduced pressure of the fluid in the injection region 76.

The additive fluid enters the injection region 76 through an additive liquid port 78. This port communicates through the injection housing insert wall 55 via an additive circuit check valve outlet 80. In this embodiment, the ball-type check valve is similar to the back pressure circuit check valve 68 described previously. Additive port threads 84 cooperate with a cap 85 to seal a check valve housing 86 against the insert outer wall 55. An O-ring 83 provides a seal between the valve housing 86 within the channel created inside the nozzle 84. Additive injection circuit 40 is joined to the additive outlet 80. The cap 85 is used to secure the injection circuit 40 against the check valve outlet 80. The O-ring 87 is used to create a seal with a ball 82, and housing insert 54. The ball 82 resides in the substantially cylindrical cavity between the liquid port 78 and outlet 80 to constrain flow when the magnitude of fluid velocity through the valve is too large toward the annular space 76. This would occur when another injector in the series is turned on, thus valving off this injector from the activated sprinkler circuit. Another O-ring 83 seals the housing 86 within the channel created inside the nozzle 84.

Figure 4:
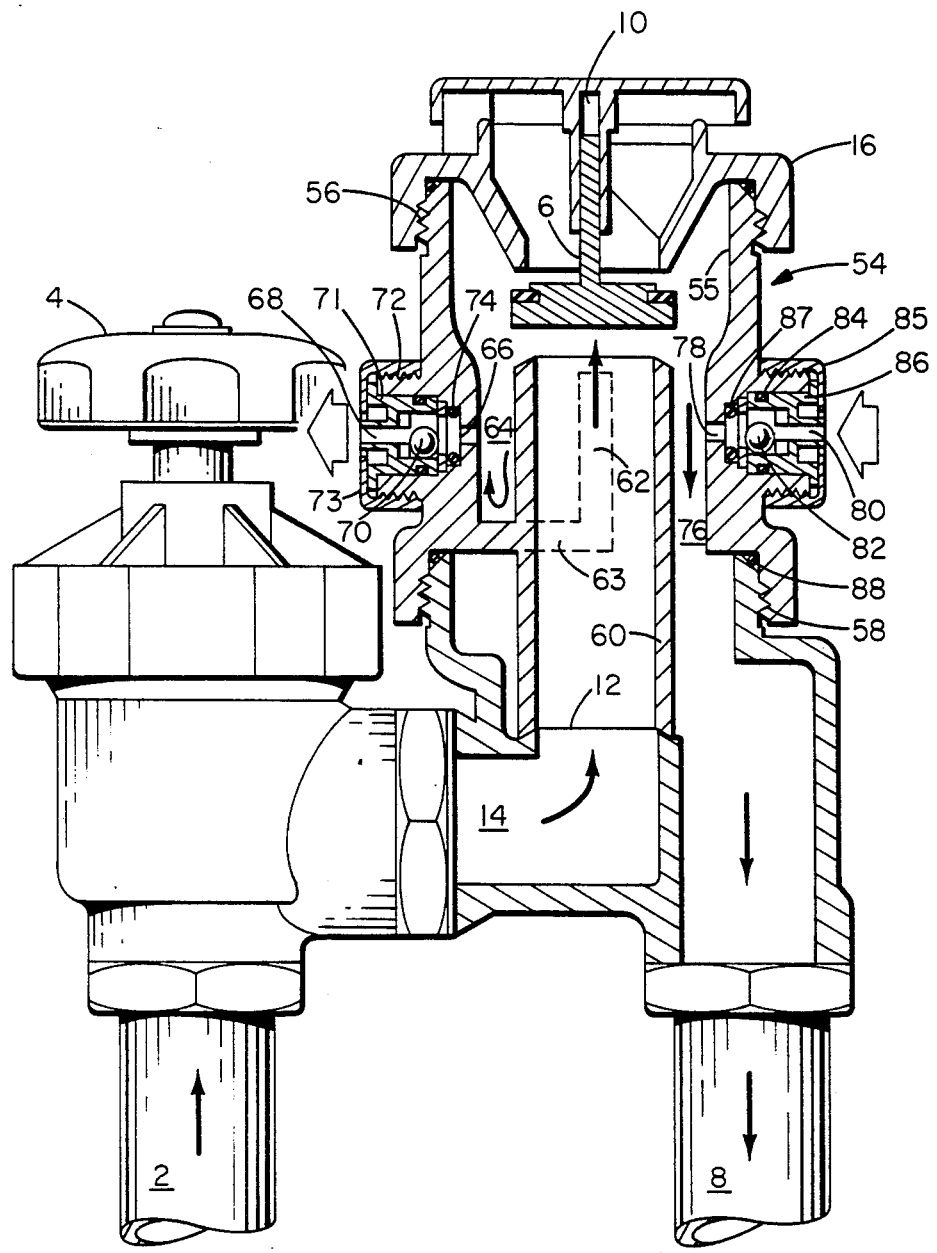
FIG. 4 is a vertical sectional view of the injection housing connected to the Richdel-type anti-syphon valve housing.

FIG. 4 shows the insert 54 mounted on a Richdel-type anti-syphon valve. The water flow path through the device is substantially the same as without the injection housing 54, and is more completely described above with reference to FIG. 1. The water enters through the water supply 2 travelling through the shut-off valve 4 into chamber 14. As noted above, the length of the fluid path is extended by the addition of the seat extension 60. Slide valve means 6 seals the fresh water supply 2 off from downstream contaminants by cooperation with the open end of extension 60. As the water flows under pressure through the valve seat and into the annular space 76, it passes the additive liquid port 78. The increased fluid velocity in this region permits injection of the additive liquid. After passing the additive liquid port 78, the water flows toward the sprinkler head circuits through water flow means 8.

It can be seen from FIG. 4 that the insert 54 and its accompanying pieces are easily incorporated into existing equipment. Upper external threads 56 are received within valve housing cap 16. Lower threads 58 are inserted within the main anti-syphon valve housing. Retrofitability in standard equipment provides much of the commercial appeal and utility for the instant invention.

The ability of this system to provide additive liquid to more than one sprinkler circuit is illustrated and described with reference to FIG. 5. Sprinkler circuits A and B are connected to the additive bag 18 and rigid container 20. Although this description is made with reference to only two sprinkler circuits, it is within the scope of this invention for there to be a greater number of sprinkler circuits connected to the same additive bag 18 and rigid container 20. In operating these sprinkler circuits, it is recognized that the water pressure in circuits A and B may be different. The ability of the system to inject additive liquid into the injection region 76 is a function of the pressure exerted on both sides of the additive bag 18; the system should be designed to respond to both subtle and dramatic pressure changes. While the cooperation of the check valves 36, 68 and 78 is required for proper operation, it is pressure relief valve 46 which provides the dynamic responses to pressure changes which are required to service more than one sprinkler circuit. The ability of pressure relief valve 46 to vent rigid container 20 to the atmosphere through the vent 48 permits a series of sprinkler circuits to be joined to one additive bag 18 and rigid container 20 without the use of a pump. Since the force which causes additive liquid to be injected into the fluid is based upon a very slight difference in pressure, each time one water supply is turned off, and another turned on, the rigid container must be able to sense this flux and respond appropriately.

To illustrate how the system is capable of responding to variable operating pressures, sequential operation of circuits A and B will be described to show the various valve responses and positions. Water supply 2a is turned on by opening valve 4a; water supply 2b is off at this time. The water pressure from supply 2a causes slide valve means 6a to rise in its channel 10a. Water flows up through the chamber 14a, out through the valve extension 60a into the reservoir 64a, and then into the injection region 76a. Circuit B, without elevated pressure from supply 2b is maintained at atmospheric pressure. As a result, check valves 68b and 80b close under the force of external pressure to prevent fluid flow into the injection housing 54b and to sprinkler circuit B. With circuit B valved off from circuit A by the check valves 68b and 80b, the rigid container 20 obtains a steady state operating pressure substantially equivalent to the dynamic pressure of the sprinkler circuit A. The rigid container 20 communicates with supply 2a through pressure relief valve 46 which is closed off from its vent location 48 by a slide valve member 92. The pressure in the additive bag 18 is determined by its flexible walls, which are responsive to external pressure, and the "closed loop" nature of the system under these operating conditions. The additive liquid is forced out of the additive bag 18 through check valve 36 and into the delivery line 38. From there, the additive liquid flows through the additive injection circuit 40a toward the check valve 78a. Since the water pressure in the injection housing 54a is substantially equivalent to the additive liquid pressure from additive bag 18, check valve 78a does not close because the magnitude of fluid flow velocity through check valve 78a is small. As noted above, the venturi effect created by increased fluid flow velocity in the injection housing 54a allows the additive fluid to enter through check valve 78a because the additive fluid is at a slightly higher pressure than the fluid flowing rapidly past the injection region 76a. When the system reaches equilibrium, relatively little fluid flows through rigid container line 44. The amount of fluid flowing through line 44 is substantially equivalent to the amount of additive delivered from the additive bag 18 via additive injection circuit 40a. The volume of additive fluid leaving additive bag 18 is controlled by the trim of needle valve 52, located between the additive bag seal 22 and additive outlet check valve 36.

When circuit A is shut down, by turning off water supply 2a via shut-off valve 4a, the pressure in the entire system (all circuits) drops to atmospheric pressure. Slide valve means 6a closes off the water supply 2a from downstream contaminants by sealing at valve seat extension 60a. The decrease in pressure in the injection housing 54a which results from turning off supply 2a is communicated through additive injection circuit 40a and rigid container line 44. As a result, the force against the top, external side of the pressure relief valve 46 is reduced. When this occurs, slide valve member 92 moves towards the top of the cap 30 because the magnitude of the pressure within rigid container 20 exceeds the magnitude of the pressure on the top side of valve 46. Valve piece 90 is forced up against the slide valve member 92 by the pressure differential, causing member 92 to move in its channel. As slide valve member 92 moves away from lower chamber 96 and toward the top of the relief valve 46, it exposes the vent location 48. This allows the rigid container 20 to vent above atmospheric pressure and reduces the conditions in additive bag 18 and rigid container 20 to atmospheric pressure. In this embodiment, the pressure relief valve 46 must be more sensitive than check valve 68; it must be activated before the check valve 68 closes.

This venting step between sequential operation of sprinkler circuits A and B is necessary. Without the pressure relief valve 46, the additive bag 18 and rigid container 20 would stay at a pressure substantially equivalent to the dynamic pressure of circuit A, even after supply 2a has been turned off. This occurs because the check valves 68 and 78 close due to the rapid fluid flow created by large pressure differentials across the valves. If the dynamic water pressure of 2b is not greater than the dynamic water pressure of 2a, then the additive bag 18 and the rigid container 20 would be sealed off from the system because check valves 68 and 78 would remain closed. By dropping the additive bag back down to atmospheric pressure, each circuit may operate independently, reducing the importance of the various circuit dynamic pressures.

After the pressure relief valve 46 of the instant invention operates to vent additive bag 18 and rigid container 20 to the atmosphere after supply 2a is shut off, circuit B is ready to commence operation. The fluid flow path is substantially the same as in circuit A.

Figure 6:
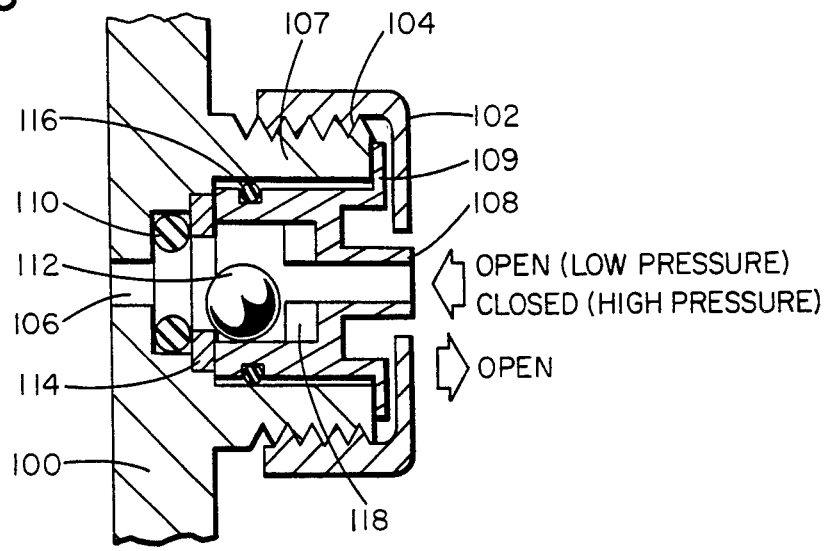
FIG. 6 is an enlarged vertical sectional view of a check valve on the injection housing liquid ports.

An exploded view of one embodiment of an injection housing port check valve is shown in FIG. 6. The outer perimeter of the check valve comprises an injection housing nozzle 100 and a cap 102. The nozzle 100 in this embodiment is contiguous with the injection housing cylindrical wall 54 (not shown in this figure) and constitutes an aperture therethrough. The cap 102 is fastened to the nozzle 100 by nozzle threads 104. Fluid flows through the check valve from an injection port inlet 106 to an injection port outlet 108. The main body of the check valve comprises a check valve insert 107 which has an "H" shaped cross-section. The insert 107 is placed inside of the nozzle 100. A lip 109 is received in the space between nozzle 100 and cap 102. The injection port outlet 108 is substantially cylindrical and passes through an aperture in cap 102. When tubing is to be connected to the outlet 108, cap 102 is removed and the tubing end inserted through the aperture in cap 102.

The tubing can then be slid over the end of outlet 108; cap 102 is then screwed back onto nozzle 104 creating a tight seal at the tubeoutlet 108 connection.

A valve insert O-ring 110 and restrictor washer 114 are held in position by insert 107. Insert 107 is sealed within the nozzle 100 be a sealing O-ring 116. In this embodiment, a Viton O-ring seal 110 is 3/32 inch thick, having 5/32 inch inner diameter and 11/32 inch outer diameter. The substantially cylindrical cavity in which the ball 112 is held has a diameter of approximately 5/16 inches. The restrictor washer 114 is 7/32 inside diameter with 7/16 inch outside diameter.

The check valve operates when the 3/16 inch stainless steel ball 112 is moved by the flow of fluid through the valve from outlet 108 toward injection port 106. When the fluid velocity is sufficiently high, the ball 112 is positioned over the restrictor washer 114 against the valve insert O-ring 110. The mass of the ball 112 is large enough to require a high velocity flow through port 106 and 78b to cause the valve to close. Alternatively, when the flow is from injection port 106 to outlet 108, the ball 112 rests against the flange 118, not restricting flow towards the outlet 108.

Figure 7:
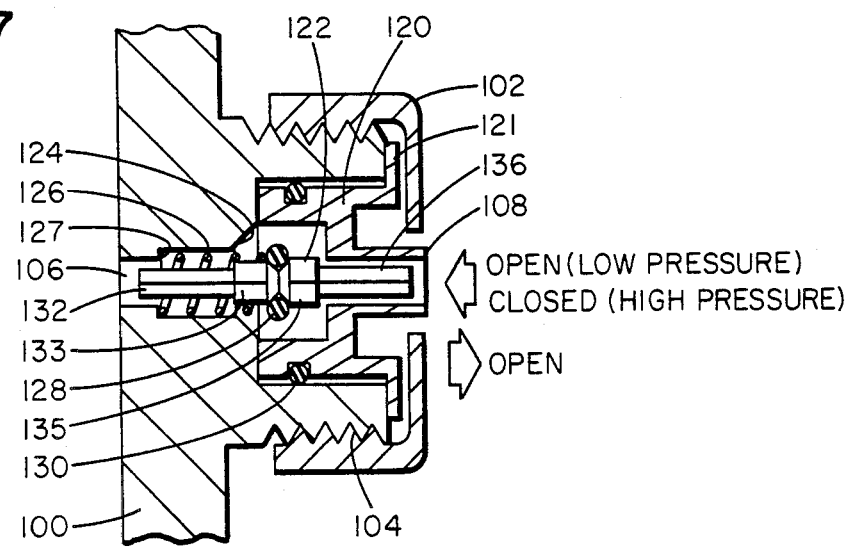
FIG. 7 is an enlarged vertical sectional view of another embodiment of the injection housing check valve.

FIG. 7 shows another preferred embodiment of an injection housing port check valve. This embodiment of the check valve can be used as either the back pressure check valve or the additive liquid check valve. The overall construction of the valve shown in FIG. 7 is similar to the embodiment shown in FIG. 6. The outer perimeter of the check valve comprises an injection housing nozzle 100 and a cap 102. The nozzle 100 is contiguous with the injection housing outer surface and constitutes an aperture therethrough. The cap 102 is fastened to the nozzle 100 by nozzle threads 104. The main body of this check valve comprises a check valve insert 120 which has an "H" shaped cross-section. The insert 120 is placed inside of the nozzle 100. A lip 121 is received in the space between nozzle 100 and cap 102. The port outlet 108 is substantially cylindrical and passes through an aperture in cap 102. When tubing is to be connected to the outlet 108, cap 102 is removed and the tubing end inserted through the aperture in cap 102. The tubing is then slid over the end of outlet 108; cap 102 is screwed back onto nozzle 104, creating a tight seal at the tubing-outlet 108 connection.

The operation of this check valve differs from the ball-type embodiment shown in FIG. 6 in the operation of pressure-sensing valve means 122. In the ball-type check valve shown in FIG. 6, the weight of the ball 112, the size of the restrictor 114 and the inside diameter of check valve insert 107 determined the valve's response to pressure differential induced flow through the valve. Pressure-sensing valve means 122 does not use mass as the response determinative parameter, but instead depends upon the relationship between the magnitude of the fluid flow, the amount of surface area resistant to the flow through the valve, and the force of a valve spring 126.

There are several dimensional relationships between valve means 122 and its surrounding cavity formed by nozzle 100 and insert 120 which permit proper operation of the check valve under all anticipated operating conditions. Valve means 122 has five distinct regions. (See FIG. 8.) Its smallest diameters are in sections 132 and 136 which are received within the inlet 106 and outlet 108, respectively. Valve means 122, with the exception of section 134, has a "+" (cross-like) cross-sectional area in the plane perpendicular to the view illustrated in FIG. 7. Thus, even though the apparent annular flow area is small in both the inlet 106 and outlet 108, the shape of valve means 122 does not greatly reduce the available flow area through the valve. Briefly, valve means sections 132 and 136 are received within inlet 106 and outlet 108, but do not constrict or prevent fluid flow.

Referring again to FIG. 7, the cavity formed by the insert 120 and nozzle 100 is substantially cylindrical with a cone-like section at the end of the cavity closest inlet 106. This part of the cavity is referred to as valve seat 124. The diameter of the cavity at valve seat 124 permits sections 132 and 133 of valve means 122 to pass through it; however, section 134 does not pass through the cavity opening at seat 124. Thus, when sufficient external pressure is exerted to compress spring 126, the valve closes when section 134 meets valve seat 124. On the other side of the cavity, closest to the outlet 108, section 136 is received within the cylindrical opening outlet 108. However, section 135 has a diameter which is larger than the opening to outlet 108 at this end of the cavity. Consequently, section 134 cannot close this end of the cavity. Given the shape of section 135, fluid can flow past the cavity into outlet 108 despite the presence of the section 135 in the path of fluid flow. This relationship means that the check valve will always be open to fluid flow in the direction from inlet 106 to outlet 108. When the fluid flow is in the opposite direction, the check valve will close only when the force exerted against section 134 is large enough to compress spring 126.

O-ring 128 is used to create a proper seal between section 134 and seat 124. O-ring 130 fits in the annular space between the nozzle 100 and insert 120.

Figure 8:
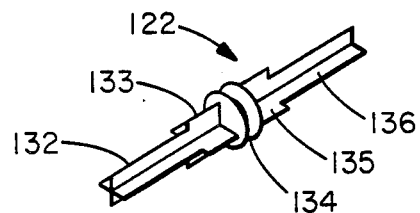
FIG. 8 is a perspective view of valve disk means of the check valve.

Referring now to FIG. 8, the shape of valve means 122 can be more clearly shown. Sections 132 and 136 comprise two planes perpendicularly disposed and have the smallest diameters of means 122. Sections 133 and 135 have slightly larger diameters, and their two planar sections are contiguous with sections 132 and 136, respectively. The main valve section 134 is disk-shaped, having a circumferential slot in which an O-ring is placed to improve seal quality. (See O-ring 128 in FIG. 7.) The disk-shaped region of section 134 is located between, and connected to, sections 133 and 135.

FIG. 9 illustrates how the rigid container 20 is sealed off from the additive bag 18 when pressure is applied to the radial sections of seal 22 indicated as 22b. The seal is created by the force of cap 32 as it is secured to the nozzle of the rigid container 20. The valves and passageways which permit connection of the additive bag and rigid container to the injection housing are shown. The relationship between the additive bag 18, the rigid container 20 and the cap 32 have been more fully described with reference to FIGS. 2 and 5 above. The focus of this description is directed towards the cap 32 and the three valves contained therein.

The rigid container 20 communicates with the sprinkler circuits through pressure relief valve 46 which constitutes, in part, an aperture through the cap 32. Fluid flows in and out of the rigid container 20 via overflow outlet 26. The fluid enters the cap 32 at the rigid container outlet 50. Outlet 50 opens into a relief valve lower chamber 96 whose dimensions are carefully selected to cooperate with a valve standpiece 94. Its operation will be more fully set forth with respect to FIGS. 10 and 11a–11f. Valve piece 90 comprises a pair of disks joined by a section having "+" (cross-like)

cross-section. Beneath the lower disk is subtended valve standpiece 94.

The dynamics of the relief valve 46 are based upon the vertical movements of slide valve member 92 in the cavity created within cap 32. The forces exerted by the fluid flowing through the valve 46 cause the upper and lower disks of valve piece 90 to act upon a slide valve seat 98. In this preferred embodiment, the slide valve seat 98 is contiguous with slide valve member 92 and comprises a wedge affixed to the inner wall of the slide valve member 92. It is contemplated that other geometric configurations which permit the translation of force from the valve piece 90 and its disks to the slide valve member 92 and which can cooperate with said disks to form a seal are within the scope of this invention. The lower boundary for movement by slide valve member 92 is defined by the lower chamber 96 which tapers down to outlet 50. In this particular embodiment, the chamber 96 diameter steps down to an intermediate value before it meets the outlet 50. Any chamber configuration whose diameter tapers to outlet 50 is intended to be within the scope of this invention. The upper boundary for movement of slide valve member 92 is defined by the lower extremity of a relief valve insert 139. The distance between the upper and lower boundary of slide valve member 92 movement must exceed a certain minimum value in order for vent 48 to become exposed to the rigid container contents. The location of this vent 48 is also chosen to help purge any air that may have entered the area between the rigid container 20 and the additive bag 18.

Relief valve insert 139 is contained within a relief nozzle 137 having external threads to which relief nozzle cap 138 is attached. An O-ring 140 surrounds the lower part of insert 139 to enhance the quality of the seal between the insert 139 and inner wall of nozzle 137. Rigid container line 44 can be fastened to the insert 139 by placing its one end through the aperture in cap 138 and tightening the cap 138 against the threads in nozzle 137.

Since the entire system operates at above atmospheric pressure, O-rings are provided to improve the quality of the seals where two plastic pieces meet. In this embodiment, O-rings 142 and 144 are provided to isolate the vent 48 from the relief valve 46 when it is operating at above atmospheric pressure. O-rings 146 and 148 are provided at the outer circumferences of the valve piece 90 disks so that a good seal can be formed when the disks meet the slide valve seat 98.

Additive fluid flows between additive bag 18 and the sprinkler circuits through the additive outlet check valve 36 which valve prevents unwanted backflow into the additive bag 18 which could cause dilution and/or contamination. An additive nozzle 150 extends from the cap 32; in this embodiment, nozzle 150 is in the center of cap 32, but other locations are contemplated and intended to be within the scope of this invention. As the additive outlet 34 opens into the nozzle 150, O-ring 152 and restriction washer 154 are provided to create a seal with an additive check valve insert 156. The insert 156 is surrounded by an O-ring 158 which seals the insert 156 within the nozzle 150. The insert 156 has a lip which is received within the space between the nozzle 150 and a nozzle cap 160. The cap 160 is fastened to the nozzle 150 via external threads on nozzle 150. The valve 36 operates when a ball 162 moves away from its gravity induced position resting on the restriction washer 154 and O-ring 152.

Another preferred embodiment of the additive outlet check valve 36 includes the use of the O-ring type check valve described with reference to FIGS. 7 and 8 instead of the ball 162. If this embodiment is used, the spring 126 can be omitted since the force of gravity will cause the valve to remain closed without the spring 126.

The amount of additive fluid which leaves the additive bag 18 can be regulated by the needle valve 52. The needle valve 52 is contained in an upper section of cap 32, above the neck of rigid container 20. Needle valve cavity 162 is substantially cylindrical and disposed in a horizontal position in the cap 32. Needle end 164 passes through additive outlet 34, restricting the available flow area. Since the pressure differential across the needle valve 52 remains substantially constant, the reduction in flow area caused by the trim of the needle end 164 is directly proportional to the volume of additive flow. The position of the needle end 164 with respect to the additive outlet 34 can be changed by rotation of the needle about its longitudinal axis because of threaded stem 166. Threaded stem 166 extends from the needle end 164, through a cavity O-ring 168 and cavity washer 170. Tension is applied against the washer 170 by a spring 172 contained between the washer 170 and screw head 174. This screw head 174 contains a slot 175 which can be used in conjunction with a screwdriver to rotate the stem 166 about its longitudinal axis and thereby adjust the trim of the needle valve 52.

Although FIG. 9 illustrates a seal 22 which has an overall concave shape which dips below the upper limit of the rigid container 20 nozzle and utilizes a stem 24 to communicate with the cap 32, other embodiments are within the intended scope of this invention. One preferred embodiment has a seal 22 which lies flush against the inside of cap 32 and communicates therethrough via an apurture rather than a stem 24.

Figure 10:
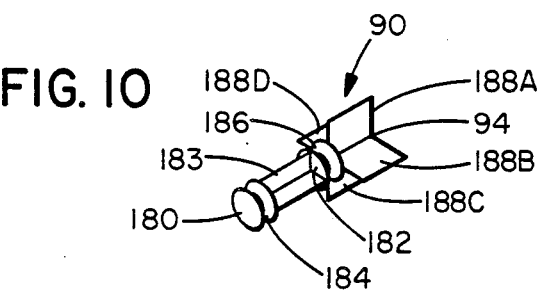
FIG. 10 is a perspective view of the valve disks and valve standpiece of the pressure relief valve.

An exploded view of valve piece 90 is shown in FIG. 10. Two disks 180 and 182 are connected by a valve bar 183 which supports the two disks in a substantially parallel position. Valve bar 183 cmprises four planar sections oriented radially about the longitudinal axis of valve piece 90. The radial dimension of each planar section is slightly smaller than the radii of disks 180 and 182. Each of the disks contains a circumferential channel, 184 and 186 respectively, which provides a location for placement of an O-ring to extend the radial dimensions of the disks 180 and 182 for cooperation with the slide valve seat 98 (shown in FIG. 9). Valve standpiece 94 is located on the side of disk 182 opposite to the valve bar 183.

Valve standpiece 94 comprises four planar sections 188a, 188b, 188c and 188d, which in this preferred embodiment of the invention are coplanar with the planar sections of valve bar 183. However, embodiments in which sections 188a–d are not coplanar with the sections of valve bar 183 are intended to be within the scope of this invention. It can also be seen from FIG. 10 that the radial dimensions of sections 188a–d exceed the radius of disk 182, even when this radial dimension is extended by the insertion of an O-ring in channel 186. The importance of the relative dimensions of the various components of the valve piece 90 will become more apparent when the operation of the pressure relief valve is sequentially described in FIGS. 11a–11f.

Figure 11:
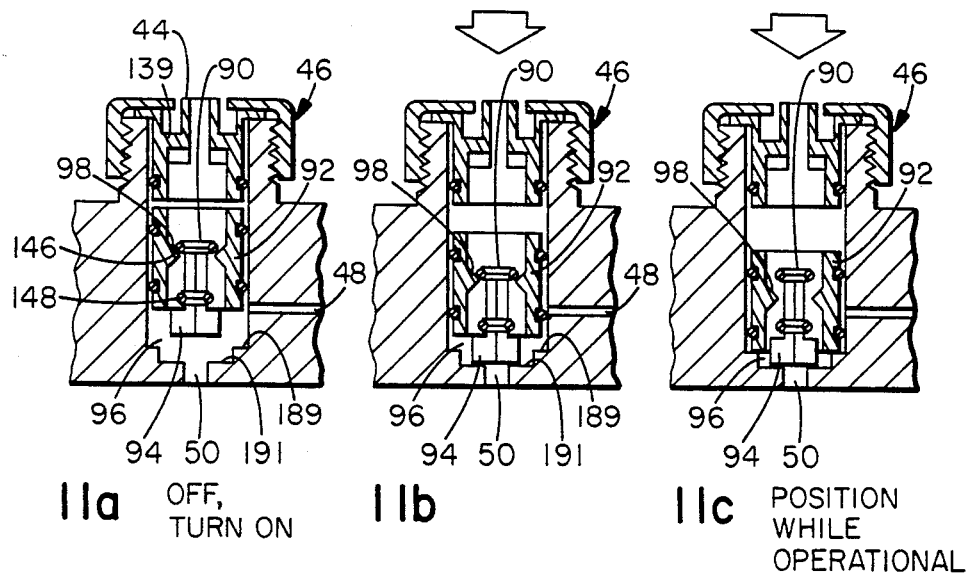
FIG. 11a through f are enlarged vertical sectional views of the pressure relief valve in sequential steps of operation.
Figure 11:
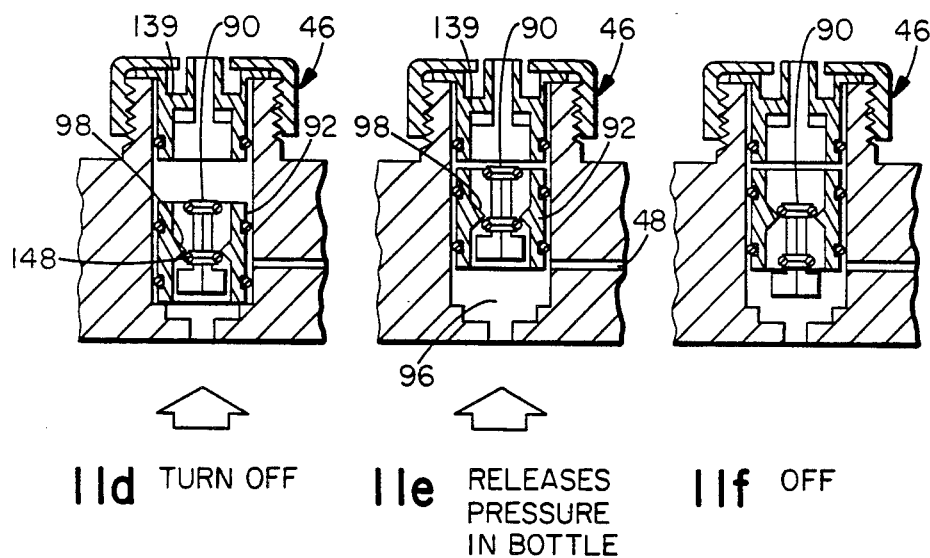

As noted above, the pressure relief valve 46 is part of the rigid container circuit, providing back pressure on the additive fluid to induce its injection into the fluid flowing towards the sprinkler head. FIG. 11a shows the pressure relief valve 46 in a terminal position. This configuration corresponds to "Off." Most notably, the slide valve member 92 has been forced upwards past vent 48. Exposure of vent 48 permits the rigid container to vent any excess pressure to the atmosphere through outlet 50 and the vent 48.

Since the system has been turned "off," there are no above atmospheric pressure forces on the upstream side of the rigid container line 44. As a result, the slide valve member 92 stays in its uppermost position, close to the valve insert 139. Valve piece 90 is subtended from slide valve seat 98, O-ring 146 extending the diameter of the disk to create a seal with seat 98. However, the valve piece 90 and slide member 92 are not forced downwards because there is no above atmospheric pressure source.

FIG. 11b shows an intermediate position in valve operation which occurs when an external pressure source is applied to the upstream side of valve 46. The force of the water supply pressure impinges on the top disk of valve piece 90 and valve seat 98; this impingement causes slide valve member 92 to move down over vent 48 and into the lower chamber 96. It can be seen that slide valve member can travel downwardly until it strikes a chamber end wall 189. Valve piece 90 has a lower limit, too. Since the standpiece 94 diameter exceeds the diameter of outlet 50, the valve piece 90 rests upon a valve limiter 191.

The downward force created by the external pressure causes the slide valve member 92 to continue to move into lower chamber 96, as can be seen in FIG. 11c. This configuration of the valve piece 90, slide valve member 92 and valve seat 98 corresponds to the position of valve 46 while operational. The longitudinal dimensions of the valve piece 90 and slide valve member are carefully selected to permit relatively unrestricted flow through valve 46 under steady-state operation. The radially extended planar sections of valve piece 90 permit flow through the valve 46, even when the standpiece 94 rests on the outlet 50. The fluid flow through valve seat 98 is also relatively uneffected by the midsection of valve piece 90.

The ability of this valve 46 to sense subtle pressure changes and to react to them is described with reference to FIG. 11d. In this figure, the external pressure source has been shut "off", causing the upstream pressure to rapidly approach atmospheric. However, the pressure within the rigid container is above atmospheric. Consequently, valve piece 90 is forced up against valve seat 98, forming a seal with O-ring 148. The valve continues to react by causing slide valve member 92 to move up towards the insert 139.

FIG. 11e shows the valve configuration as the above atmospheric pressure in the rigid container is vented through vent 48. Valve member 92 has reached its upper terminal position against insert 139. Vent 48 has been exposed to the lower chamber 96. However, since the orifice of vent 48 is relatively small, valve piece 90 remains thrust up against slide valve seat 98. Once the pressure has been exhausted, valve piece 90 drops back down into its "off" position, FIG. 11f exactly corresponding to the configuration of FIG. 11a.

Figure 12:
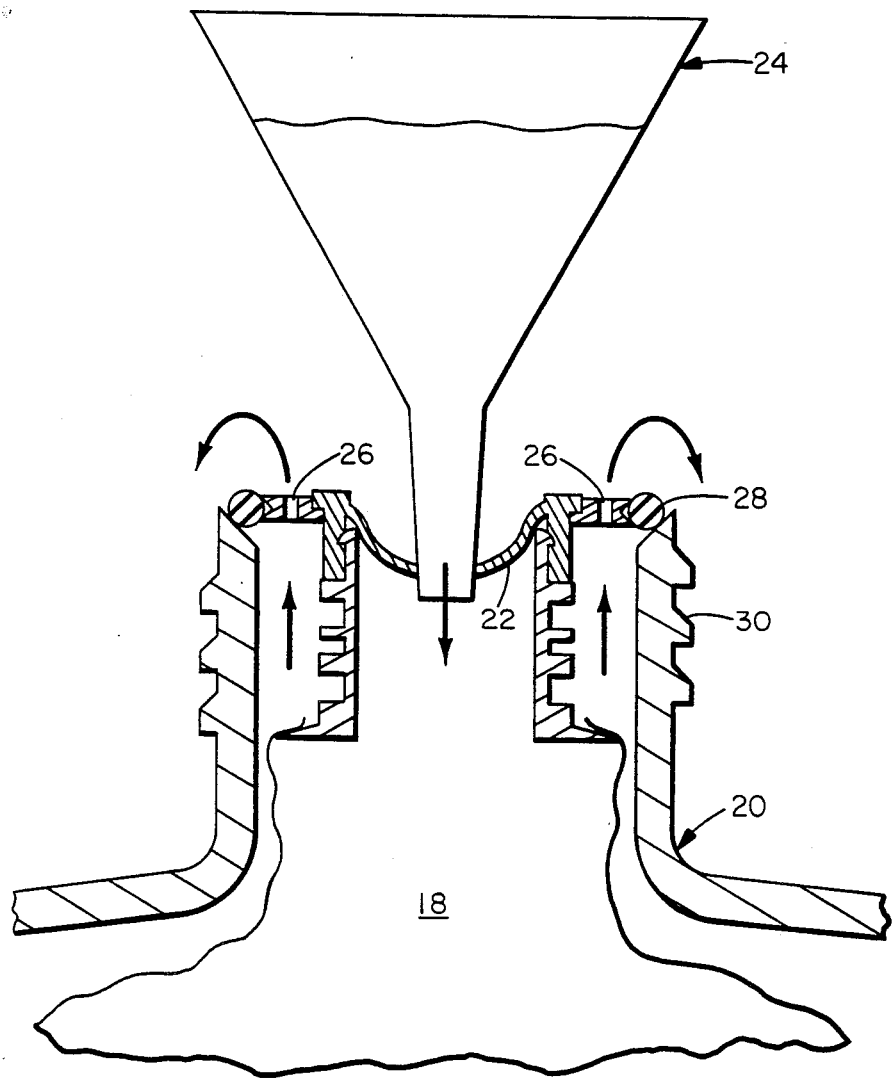
FIG. 12 is an enlarged, detailed, sectional view of the additive bag and rigid walled container neck, showing the addition of liquid to the additive bag.

The details of the liquid containers which are to be connected to the anti-syphon valve housings are shown in FIG. 12. The additive bag 18 is received within the rigid container 20. The additive bag 18 has flexible walls, permitting an external pressure to act upon it contents and against an additive bag seal 22. As shown in FIG. 12, a funnel with a stem 24 may be inserted through the additive bag seal 22 to fill the additive bag 18. In this preferred embodiment, water is used to fill the rigid containers 20, including the space between the additive bag 18 outer wall and the rigid container 20 inner wall. The head pressure caused by the weight of a column of liquid in the funnel stem 24 forces displacement of water from this intermediate space. The displaced water leaves the rigid container 20, through overflow outlet 26 which surrounds the additive bag seal 22. As above, the seal 22 presented in FIG. 12 is only one preferred embodiment. Other seals are intended to be within the scope of this invention.

Figure 13:
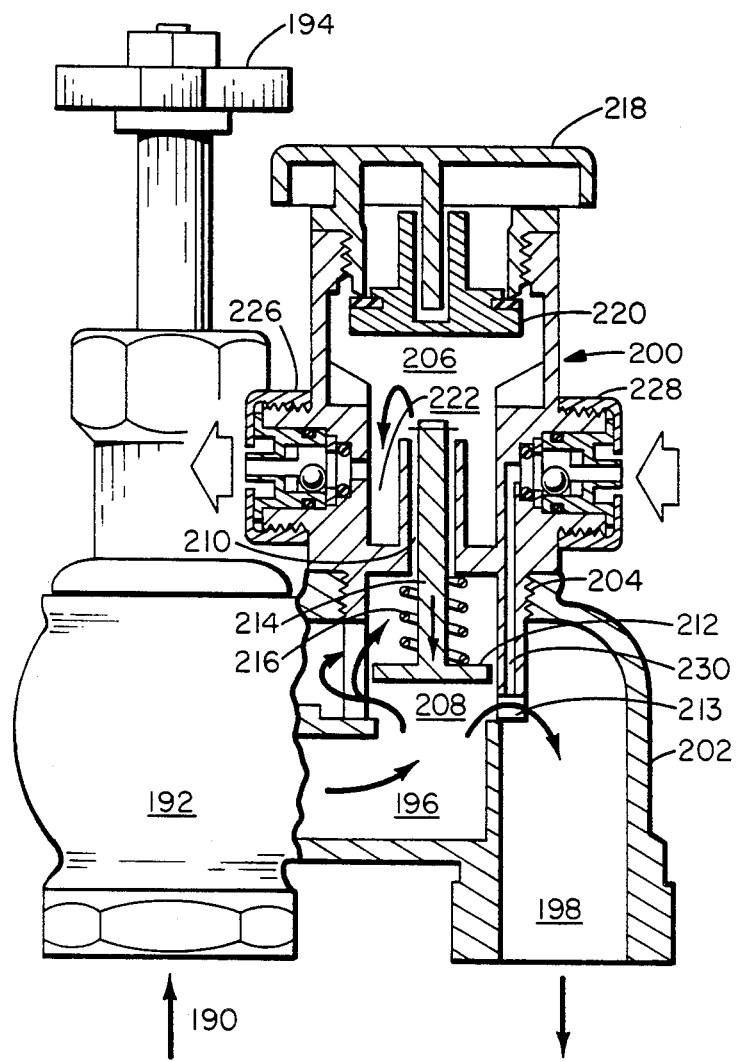
FIG. 13 is an elevational view of another embodiment of the injection housing and Champion-type cast metal anti-syphon valve housing.

Another embodiment of the injection housing which is inserted into a Champion-type anti-syphon valve is shown in FIG. 13. Water supply means 190 is controlled by shut-off valve 192 which is activated by valve stem 194. The water from supply means 190 enters the anti-syphon valve through a water inlet 196. Water flow through the anti-syphon valve is completed at outlet 198 which joins with the sprinkler head circuit (not shown in this figure).

The anti-syphon valve is contained within an injection housing 200 which is fastened to the anti-syphon valve housing 202 by threads 204 externally disposed to the injection housing 200. The injection housing 200 comprises an upper chamber 206 and a lower chamber 208 which are connected by a channel 210. An anti-syphon valve disk 212 moves through the lower chamber 208, coming to rest upon a valve seat 213. When disk 212 is sealed against seal 213, the water supply is safe from contaminants existing downstream of the seat 213. The disk 212 is attached to an anti-syphon valve stem 214. Anti-syphon valve spring 216 is placed around the stem 214 and then the stem 214 is placed in the channel 210. The spring 216 provides a downward biasing force which causes the anti-syphon valve to remain in a closed position unless external pressure is applied against the disk 212 which is greater than the downward biasing force.

The upper chamber 206 of the housing 200 comprises an injection housing cap 218 and a plug 220 which are fastened to the housing 200 by internal threads. An annular space forming a reservoir 222 is created by the cylindrical wall which forms channel 210. Back pressure nozzle 226 communicates with this annular space 222, ultimately connected to the rigid container. This embodiment differs from the embodiment described with respect to FIG. 5 in that an additive nozzle 228 does not communicate with this annular space 222, but instead joins with the lower chamber 208 near valve seat 213 through an injection channel 230.

Additive liquid is injected into the water outlet 198 by the venturi effect. Since the flow area through the anti-syphon valve near seat 213 is restricted, creating high velocity flow, there is a reduction in pressure. The additive liquid is maintained at the upstream pressure by virtue of the back pressure nozzle 226 and rigid container. Thus, additive fluid flows out of channel 230 and into the region of reduced pressure near valve seat 213.

When the system is turned off, water will remain in the reservoir 222, thus preventing air from entering the rigid container 20. The embodiment shown in FIG. 13 can easily be applied to the Richdel-type anti-syphon valve with minor alterations in design.

While the subject invention has been described with reference to preferred embodiments, it will be apparent that other changes and modifications could be made by one skilled in the art, without varying from the scope or spirit of the claims appended hereto.

I claim:

1. A system for delivering controlled amounts of liquid additives to at least one irrigation unit which irrigation unit comprises a water supply, a shut-off valve, an anti-syphon valve seat, water flow means and a sprinkler head, and wherein the delivery system comprises:
   (a) an additive bag of flexible construction;
   (b) a rigid container, said additive bag received within the rigid container, and said bag and container separately sealed to prevent crossmixing of liquids contained therein, and to permit a differential in pressure to exist between them;
   (c) an injection housing, substantially cylindrical, open and threaded at one end, and having a valve seat extension longitudinally disposed through a second end of the housing, said injection housing being connected to the irrigation unit anti-syphon valve seat;
   (d) two liquid ports for communication through the curved surfaces of said injection housing;
   (e) first fluid flow means for joining said rigid walled container to said first liquid port; and
   (f) second fluid flow means for joining said additive bag to said second liquid port.

2. The delivery system of claim 1 wherein said second fluid flow means comprises, in part, a needle valve to control the magnitude of liquid additive flow towards said injection housing and second liquid port.

3. The delivery system of claim 1 wherein said second fluid flow means comprises, in part, at least one check valve to prevent backflow of water into said additive bag.

4. The delivery system of claim 1 wherein said first fluid flow means comprises, in part, a pressure relief valve, said valve venting said rigid container to the atmosphere when said irrigation unit is closed off from the water supply.

5. The delivery system of claim 1 wherein said first fluid flow means comprises, in part, a pressure relief system which comprises:
   (a) an elongate outer valve housing wherein a path of fluid flow occurs generally along a longitudinal axis of said housing, through effluent openings at both ends of said valve housing;
   (b) an annular channel member whose length is less than that of said valve housing, and which channel member is sealingly received within the valve housing such that said channel member is capable of sliding in a direction along the valve housing's longitudinal axis;
   (c) valve seat means, located on an inside wall of the channel member;
   (d) valve disk means comprising, in part, two disks connected by a shaft between them, said shaft substantially coincident with a longitudinal axis of the valve housing;
   (e) valve stem means, subtending from valve disk means and comprising, in part, at least one generally rectilinear plate whose edge length perpendicular to the longitudinal axis of the valve housing exceeds the diameter of the valve housing effluent openings; and
   (f) a pressure relief opening in the valve housing, tangentially disposed to said sliding channel member, substantially perpendicular to the longitudinal axis of said valve housing and further comprising an aperture through said valve housing wall.

6. The delivery system of claim 1 wherein said injection housing further comprises annular gate means which comprises:
   (a) an annular section, affixed to the inner side wall of said injection housing, in a plane which is parallel to the injection housing's cylindrical base, occupying substantially one-half of the circular cross-sectional flow area of said injection housing; and
   (b) two vertical diameter sections, each section being substantially rectilinear, having one edge affixed to the inner side wall of the injection housing in a plane parallel to the longitudinal axis of the injection housing, and having an adjacent edge affixed perpendicularly to said annular section, wherein said vertical diameter sections lie in a plane defined by a diameter of the cylindrical base of the injection housing and perpendicular to said injection housing base.

7. An injection housing, substantially cylindrical and elongated, threaded and open at one end, which comprises:
   (a) an anti-syphon valve, located at the closed end of said housing, which comprises a disk a shaft and a channel, said shaft received within said channel permitting its movement in a direction along a longitudinal axis of said shaft;
   (b) an annular section, affixed to the inner side wall of said injection housing, parallel to its cylindrical base, occupying substantially one-half of the circular cross-sectional flow area of said injection housing;
   (c) two vertical diameter sections, each section being substantially rectilinear, having one edge affixed to the inner side wall of the injection housing in a plane parallel to the longitudinal axis of the injection housing, and having an adjacent edge affixed perpendicularly to said annular section, wherein both vertical diameter sections lie in a plane defined by a diameter of the cylindrical base of the injection housing and perpendicular to said base; and
   (d) two liquid ports for communication through curved surfaces of said injection housing.

8. The injection housing of claim 7 wherein one liquid port is located on that section of the injection housing curved surface which is bounded by said annular section and two vertical diameter sections.

9. The injection housing of claim 7 wherein said liquid ports communicate through check valves.

10. A system for delivering controlled amounts of liquid additives to at least one irrigation unit which irrigation unit comprises a water supply, a shut-off valve, an anti-syphon valve seat, water flow means and a sprinkler head, and wherein the delivery system comprises:
   (a) an additive bag of flexible construction;
   (b) a rigid container, said additive bag received within said rigid container and, said bag and container separately sealed to prevent crossmixing of liquids contained therein, and to permit a differential in pressure to exist between them;
   (c) an injection housing, substantially cylindrical, elongated and externally threaded near one end, said injection housing being connected to the irrigation unit anti-syphon valve seat, and comprising:

(i) a first fluid chamber, located in a closed end of said housing, (ii) a first liquid port for communication through a curved wall of said first chamber, (iii) a first liquid channel, substantially concentric with the longitudinal axis of said injection housing, (iv) a second fluid chamber, located in an open end of said injection housing and extending below said injection housing external threading, the second fluid chamber communicating with the first fluid chamber through said first liquid channel, (v) anti-syphon valve means comprising a disk, a shaft and a coiled spring, said disk approximately sized to equal the inside diameter of the injection housing, and the shaft, placed through the center of the spring coils, and the shaft is received within the first liquid channel, and (vi) second liquid port means for communication of fluid from an external source along an eccentric longitudinal axis of the injection housing towards the open end of the injection housing;

(d) first fluid flow means for joining said rigid container to said first liquid port; and (e) second flow means for joining said second liquid port means to said additive bag.

11. The delivery system of claim 10 wherein said second fluid flow means comprises, in part, a needle valve to control the magnitude of additive liquid flow towards said injection housing and second liquid port means.

12. The delivery system of claim 10 wherein said second fluid flow means comprises, in part, at least one check valve to prevent backflow of water into said additive bag.

13. The delivery system of claim 10 wherein said first fluid flow means comprises, in part, a pressure relief valve, said relief valve venting the rigid container to the atmosphere when said irrigation unit shut-off valve is closed off from the water supply.

14. The delivery system of claim 10 wherein said first fluid flow means comprises, in part, a pressure relief system which comprises:

(a) an elongate outer valve housing wherein a path of fluid flow occurs generally along a longitudinal axis of the housing, through effluent openings at both ends of said valve housing;

(b) an annular channel member whose length is less than the length of said valve housing, and which member is sealingly received within the valve housing such that said channel member is capable of sliding in a direction along the valve housing's longitudinal axis;

(c) valve seat means, located on an inside wall of the channel member;

(d) valve disk means comprising, in part, two disks connected by a shaft between them, said shaft substantially coincident with a longitudinal axis of the valve housing;

(e) valve stem means, subtending from valve disk means and comprising, in part, at least one generally rectilinear plate whose edge length perpendicular to the longitudinal axis of the valve housing exceeds the diameter of the valve housing effluent openings; and (f) a pressure relief opening in the valve housing, tangentially disposed to said sliding channel member, substantially perpendicular to the longitudinal axis of said valve housing and comprising an aperture through said valve housing wall.

15. An injection housing, substantially cylindrical, elongated and externally threaded near one end, comprising:

(a) a first fluid chamber, located in a closed end of said housing;

(b) a first fluid port for communication through a curved wall of said first chamber;

(c) a first liquid channel, substantially concentric with the longitudinal axis of said injection housing;

(d) a second fluid chamber, located in an open end of said injection housing and extending below said injection housing external threading, the second fluid chamber communicating with the first fluid chamber through said first liquid channel;

(e) anti-syphon valve means comprising a disk, a shaft and a coiled spring, said disk approximately sized to equal the inside diameter of the injection housing, and the shaft, placed through the center of the spring coils, and the shaft is received within the first liquid channel; and (f) second fluid port means for communication of fluid from an external source along a longitudinal axis of the injection housing towards the open end of the injection housing.

16. A pressure relief system which comprises:

(a) an elongate outer valve housing wherein a direction of fluid flow occurs generally along a longitudinal axis of the housing, through effluent openings at both ends of said valve housing;

(b) an annular channel member whose length is less than the length of said valve housing, and which member is sealingly received within the valve housing such that said channel member is capable of sliding in a direction along the valve housing's longitudinal axis;

(c) valve seat means, located on an inside wall of the channel member;

(d) valve disk means comprising, in part, two disks connected by a shaft between them, said shaft substantially coincident with a longitudinal axis of the valve housing;

(e) valve stem means, subtending from valve disk means and comprising, in part, at least one generally rectilinear plate whose edge length perpendicular to the longitudinal axis of the valve housing exceeds the diameter of the valve housing effluent openings; and (f) a pressure relief opening in the valve housing, tangentially disposed to said sliding channel member, substantially perpendicular to the longitudinal axis of said valve housing and comprising an aperture through said valve housing wall.

17. The relief system of claim 16 wherein the outer valve housing is substantially cylindrical.

18. The relief system of claim 16 wherein valve seat means comprises, in part, an annular wedge rigidly fastened to an inside wall of said annular channel member.

19. The relief system of claim 16 wherein said disks which comprise, in part, valve disk means, have circumferences which are surrounded by flexible O-rings.

20. A method for selectively irrigating land with an aqueous solution containing additives, which method utilizes an additive delivery system comprising a water supply, at least one sprinkler circuit, an additive liquid bag, a rigid container, at least one pressure activated valve and flow means for sealingly connecting said additive bag and rigid container to each sprinkler circuit, the method comprising the steps of:
- (a) allowing the water supply to communicate with the sprinkler circuit;
- (b) irrigating the land;
- (c) shutting off the water supply to the sprinkler circuit; and
- (d) venting the above-atmospheric pressure which has been obtained in the additive bag and rigid container to the atmosphere through a pressure activated valve.

* * * * *